United States Patent [19]

Yoshida

[11] Patent Number: 5,128,526

[45] Date of Patent: Jul. 7, 1992

[54] IDENTIFICATION CODE

[75] Inventor: Hirokazu Yoshida, Osaka, Japan

[73] Assignee: Teiryo Sangyo Co., Ltd., Osaka, Japan

[21] Appl. No.: 608,366

[22] Filed: Nov. 2, 1990

Related U.S. Application Data

[62] Division of Ser. No. 217,843, Jul. 11, 1988, abandoned.

[30] Foreign Application Priority Data

Jul. 11, 1987 [JP] Japan .............................. 62-173352
Sep. 17, 1987 [JP] Japan .............................. 62-232983

[51] Int. Cl.⁵ ...................... G06K 7/10; G06K 19/06
[52] U.S. Cl. .................................. 235/456; 235/460; 235/470; 235/494
[58] Field of Search ............... 235/494, 487, 460, 461, 235/462, 463, 466, 454, 456, 470

[56] References Cited

U.S. PATENT DOCUMENTS

| | | | |
|---|---|---|---|
| 2,820,907 | 7/1951 | Silverman | 235/454 |
| 3,632,995 | 1/1972 | Wilson | 235/494 |
| 3,835,297 | 9/1974 | Inoue et al. | 235/487 |
| 4,213,040 | 7/1980 | Gokey et al. | 235/476 |
| 4,263,504 | 4/1981 | Thomas | 235/454 |
| 4,275,381 | 6/1981 | Siegal | 235/495 |
| 4,300,123 | 11/1981 | McMillin et al. | 235/456 |
| 4,403,339 | 9/1983 | Wevelsiep et al. | 235/463 |
| 4,476,382 | 10/1984 | White | 235/494 |
| 4,748,679 | 5/1988 | Gold et al. | 235/380 |
| 4,754,127 | 6/1988 | Brass et al. | 235/456 |
| 4,776,464 | 10/1988 | Miller et al. | 235/462 |
| 4,782,221 | 11/1988 | Brass et al. | 235/454 |
| 4,786,792 | 11/1988 | Pierce et al. | 235/454 |
| 4,814,594 | 3/1989 | Drexler | 235/454 |
| 4,818,852 | 4/1989 | Haddock et al. | 235/462 |
| 4,822,986 | 4/1989 | Guthmueller et al. | 235/462 |
| 4,870,260 | 9/1989 | Niepolomski et al. | 235/454 |
| 4,886,957 | 12/1989 | Glaberson et al. | 235/454 |
| 4,924,078 | 5/1990 | Sant'Anselmo et al. | 235/456 |
| 4,939,354 | 7/1990 | Priddy et al. | 235/462 |

Primary Examiner—Stuart S. Levy
Assistant Examiner—Christopher R. Glembocki

[57] ABSTRACT

An identification code sheet for representing codes for merchandise, or the like and a method for reading the identification code sheet. The identification code sheet for identification of merchandise or the like, according to the invention, comprises a representation area defined by both a X-axis and a Y-axis intersecting mutually either orthgonally a skewedly and sub-area of identification code printed in said representation area. According to the invention, said representation area is divided into sixteen or more sub-areas, in each of which an identificiation code of signal codes of binary type is recorded. In this manner, more information may be stored compared to conventional techniques and more particularly more Kana-Kanzi, Arabic and Chinese letters etc. as well as numerical characters, symbols, and alphabets may be represented and easily read. Further, the representation of the representation area defined by both the X-axis and the Y-axis and the identification code in said sub-areas ensures accuracy and speed of reading by means of a sensor to read the identification code sheet in any direction and further a simpler reading, representation and outputting by use of a printing sheet and printing means for general use, is achievable.

3 Claims, 8 Drawing Sheets

FIG. 1
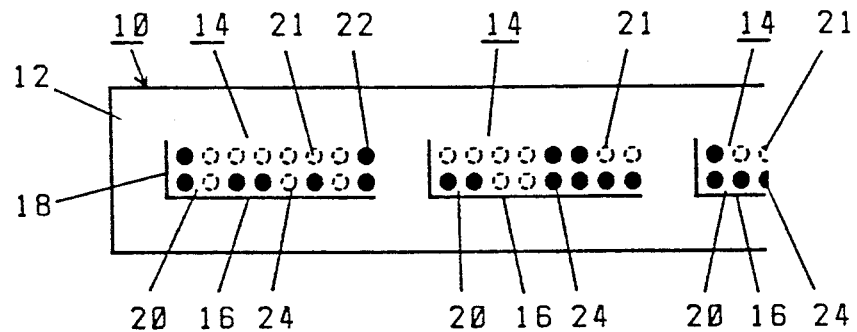
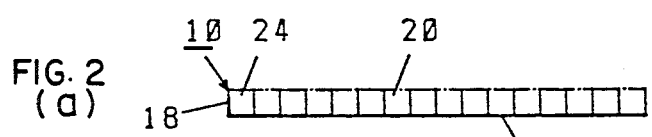
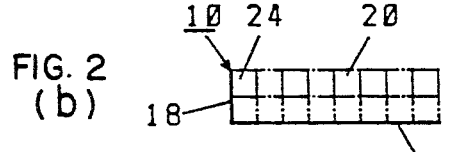
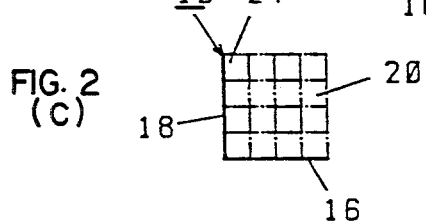
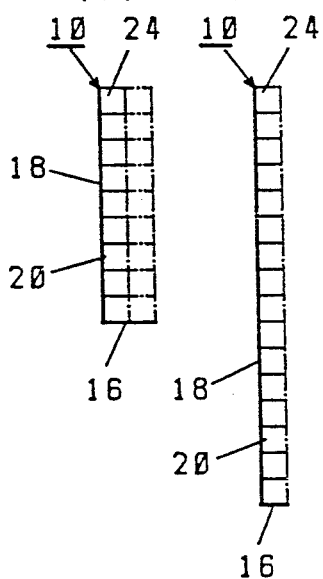
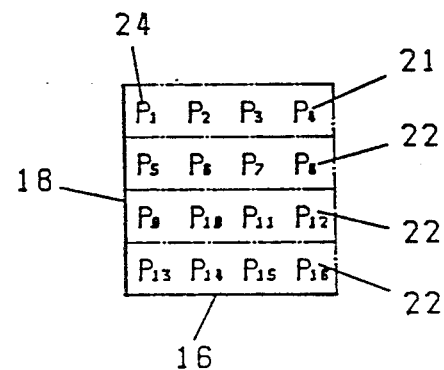

FIG. 4
P₁ P₂ P₃ P₄ P₅ P₆ P₇ P₈ P₉ P₁₀ P₁₁ P₁₂ P₁₃ P₁₄ P₁₅ P₁₆
```
                                              0000
      •                                       1000
         •                                    2000
            •                                 3000
               •                              4000
   •              •                           5000
   •  •           •                           6000
         •        •                           7000
            •        •                        8000
   •           •        •                     9000
   •  •        •        •                     A000
         •  •  •        •                     B000
   •        •  •        •                     C000
   •  •     •  •        •                     D000
   •  •  •  •  •        •                     E000
   •  •     •  •        •                     F000
   =  =  =  =  =  =  =  =  =  =  =  =  =  =  =   =
                                              =
                                              =
   •  •  •  •  •  •  •  •  •  •  •  •  •  •  •  • FFFF
```
FIG. 5
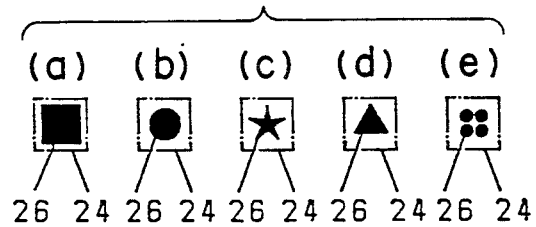
FIG. 6
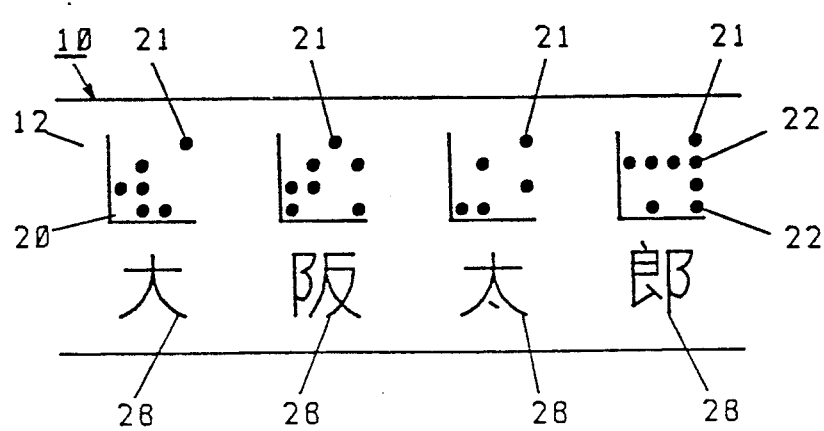

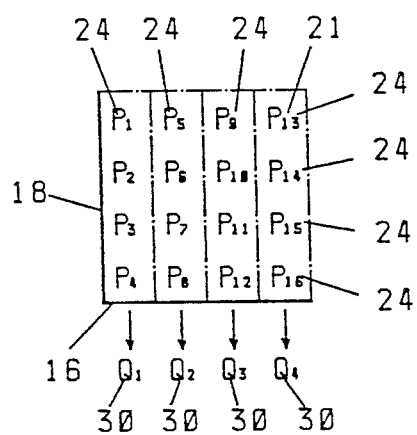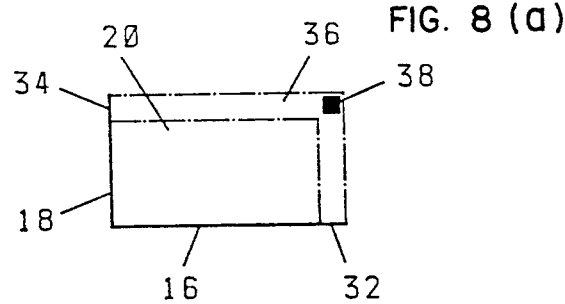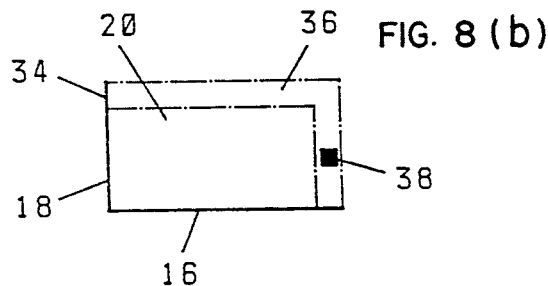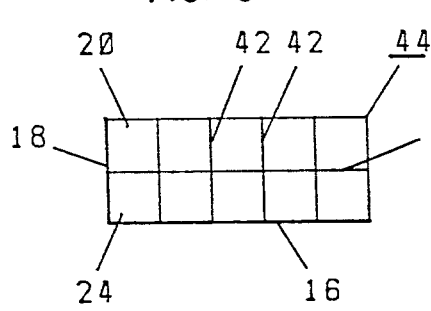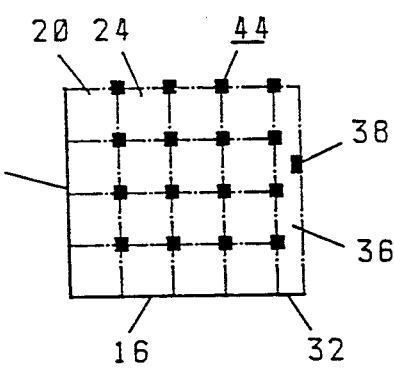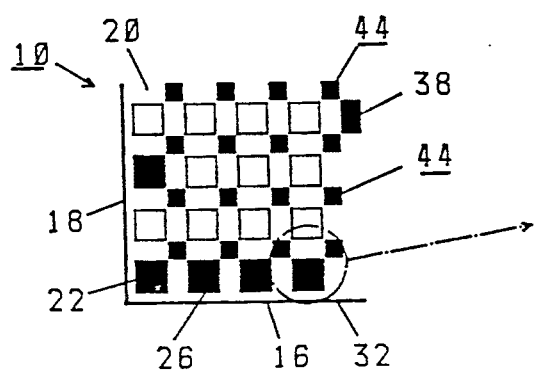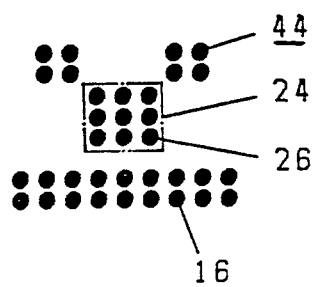

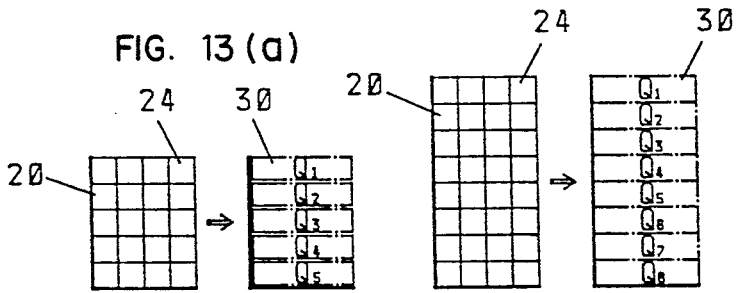
FIG. 13 (a)   FIG. 13 (b)
N = 4 × 5 = 20     N = 4 × 8 = 32
M = 5              M = 8
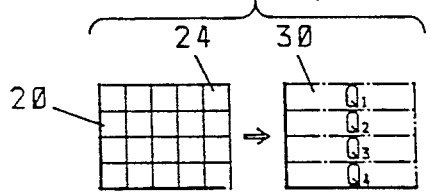 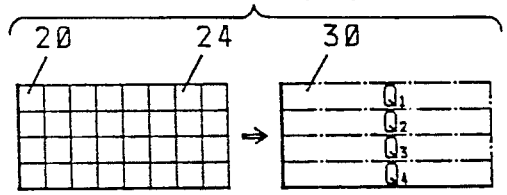
FIG. 13 (c)       FIG. 13 (d)
N = 5 × 4 = 20     N = 8 × 4 = 32
M = 4              M = 4
FIG. 14
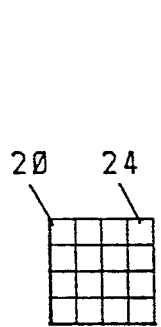 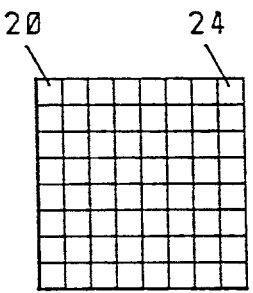 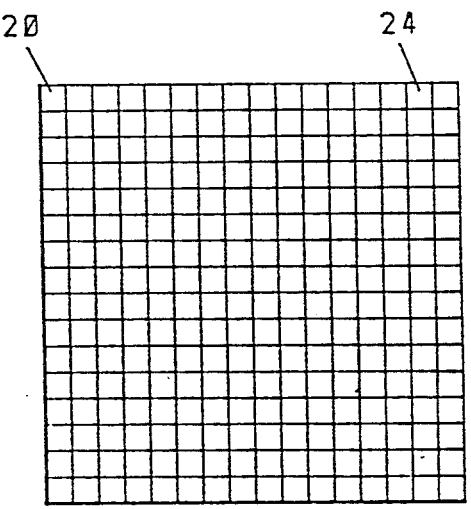
N = 4 × 4     N = 8 × 8     N = 16 × 16
= 16          = 64          = 256

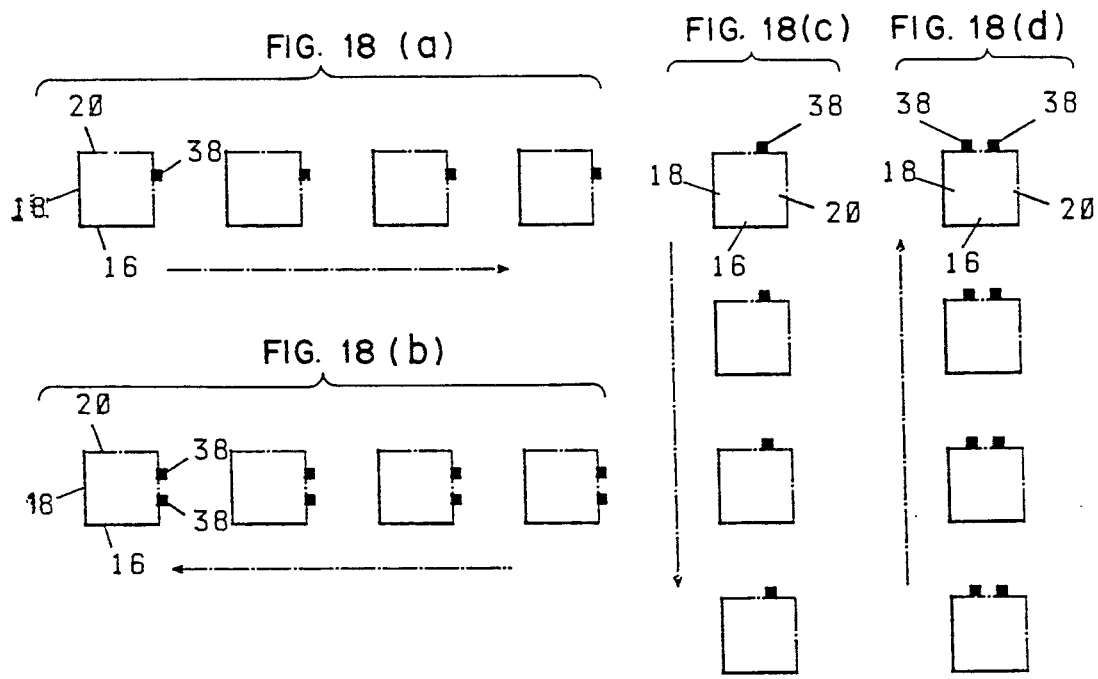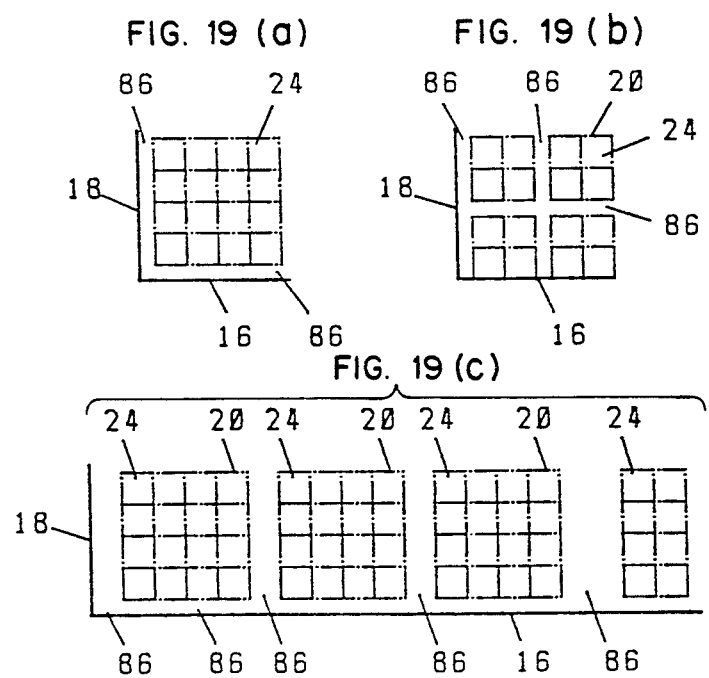

IDENTIFICATION CODE

This application is a divisional of copending application Ser. No. 07/217,843, filed on Jul. 11, 1988 now abandoned.

TECHNICAL FIELD OF THE INVENTION

The invention relates, in general, to an identification code sheet and a method for reading it and, more particularly, to an identification code sheet representing a merchandise code, a character string and a document etc. capable of identifying a numerical character, symbol, alphabetic character, a Kana-Kanzi character etc., and to a method for reading of the contents of the identification code from said sheet.

BACKGROUND OF THE INVENTION

There are both bar codes and token codes designed to represent a numerical character and/or a symbol for use in identification code sheets.

As is well known, a bar code is set up by a plurality of fine and thick bars regularly spaced and combined to represent a numerical character etc. According to the prior art, a bar code sheet set up by a combination of a plurality of fine and thick bars regularly spaced is characteristically accompanied by such drawbacks as a need for high level printing techniques on the sheet and which is very costly and requires an unnecessarily high level of accuracy for preparation.

Token code sheets for binary representation in terms of the locations of punched hole are accompanied by such drawbacks as a need of punching process and a low speed of reading relative to an optical and a magnetic types.

Other drawbacks inherent in the said types of sheet discussed are a limited capability of representing only a numerical character and a part for a character string, and a need of re-making the code content whenever an urgent change is needed to be made by the operators by code printer or a punch installed away from the site of operation, meaning substantial difficulties are encountered during data maintenance, especially for a large scale POS (Point Of Sales system).

There is also another known art represented by reading means to handle an identification code represented by a bar code system, according to U.S. patent application Ser. No. 316,936 (Japanese Patent Publication No. 21980 of 1978).

According to the prior art, bar codes are to be identified as to binary codes on the principle of finding both a finess/thickness and a location of the code bars, thus often resulting in a high likelihood of inducing reading errors; these types of codes are mostly used to represent, in general, numerical characters and rarely can handle even the letters of an alphabet. For this reason, the realization of these conventional means has not so far been achieved to cover a Kanzi-code under JIS (Japanese Industrial Standard) rule. According to the conventional art, there is also an absolute need for an exact reading of a finess/thickness and a location of the bars setting up bar codes, which means a likelihood of read errors according, depending on misprints of the code bars, elongation/shrinkage of the bar code paper, irregularity of the surfaces on which the bar code papers are to be pasted and a change in the reading angle of a senser relative to the bar code paper.

More recently, a new method of code-making is being developed, by which O to F is represented by coding properly the '⊕' character. It should, however, be noted that the '⊕' character involves, in coding thereof, such unsolved problems as a need for a specific direction of reading and specification of the same, because of the symmetrical composition of said character in both horizontal and vertical directions.

MEANS OF SOLVING THE PROBLEM AND THEIR EFFECTS

The primary object of the invention is an identification code sheet and a method for reading it, wherein a representation area is defined by both a X-axis and a Y-axis for representation of an identification code, and in said representation area are provided sub-areas in which said identification code is recorded by means of binary signals. According to the embodiment of the invention, a representation area defined by both the X-axis and the Y-axis is represented on an identification code sheet, and needed signal codes are recorded in sub-areas of said representation area, thus providing an identification code. In this manner, an exact reading of signal codes can be attained, without any limitation to the available direction of reading, by virtue of an existence of the representation area, when the identification code is read by means of a sensor to read identification codes.

Another object of the invention is an identification sheet and a method for reading it, wherein said representation area is divided into at least sixteen or more sub-areas, and in each of which said identification code set up by signal codes in terms of binary signals is recorded. According to the embodiment of the invention, a large number of data of 2 factorials can be recorded, and any representation in terms of Kana-Kanzi, Thai, Arabic and Chinese letters etc. as well as numerical characters, symbols and alphabets may be provided and read. And representation on a sheet of an ordinary quality can be made and read at a very high level of accuracy and speed, without the need special quality paper, using only printing means such as a general purpose printer designed for a microcomputer etc.

A further object of the invention is an identification code sheet and a method for reading it, wherein sixteen or more sub-areas in said representation area are grouped into four or more assemblies, in which said identification code of 2 or more signal codes is recorded. According to this embodiment of the invention, recording and reading can achieved in a number of ways depending on a proper method for selection of the assemblies which increases the available recording capacity and provides easy application for cipher conversion.

Another object of the invention is an identification code sheet and a method for reading it, wherein an auxiliary representation area is provided on the periphery of said representation area and an auxiliary mark is provided for identification of a read direction for the recorded identification code in said auxiliary representation area. This embodiment enables finding a representation area's leading end position, trailing end position and vertical and lateral directions of reading made by a sensor to read identification codes and simplifies the pasting of an identification code sheet and to carry out an identification code interpretation with improved accuracy and higher speed.

Another object of the invention is an identification code sheet and a method for reading it, wherein separation marks are provided between said sub-areas in said representation area in order to be readily interpreted for discrimination. According to the embodiment, sub-areas can be easily found by virtue of separation marks to ensure a stabilized interpretation of an identification code, even when there print errors are present and the pasting surface is irregular etc.

Further objects and advantages of the present invention will be apparent from the following description, reference being made to the accompanying drawings wherein preferred embodiments of the present invention are clearly shown.

BRIEF DESCRIPTION OF DRAWINGS

FIG. 1 is a plan view of an identification code sheet representing an embodiment of the invention, with partial cut-away;

FIGS. 2 (a), (b), (c), (d) and (e) are plan views showing variations of the embodiments of the invention, related to a representation area in the code sheet described above;

FIG. 3 is a view illustrating sub-area and the assemblies of the invention, related to the representation area described above;

FIG. 4 is a view illustrating a pattern of coding showing the number and the location of the sub-area where binary code marks exist relative to binary codes;

FIGS. 5 (a), (b), (c), (d) and (e) are detail views showing a concept of the embodied binary signal mark respectively of the invention;

FIG. 6 is a plan view of an identification code sheet comprising the characters mentioned, with partial cut-away;

FIG. 7 shows a concept of assemblies representing grouped sub-areas,

FIGS. 8 (a) and (b) are illustrations of a representation area having an auxiliary mark according to another embodiment for the identification code sheet;

FIG. 9 shows a concept of a representation area having separation lines according to another embodiment;

FIG. 10 is an illustration of representation area comprising separation marks, according to a still further embodiment of the invention;

FIG. 11 and FIG. 12 show diagrams wherein the binary code marks are included;

FIGS. 13 (a), (b), (c) and (d) and FIG. 14 give the patterns enabling establishment of both the sub-areas and assemblies of the representing area;

FIGS. 18 (a), (b), (c) and (d) show concepts of an arrangement of the auxiliary mark or marks of another embodiment of the representation area according to the invention;

FIGS. 19 (a), (b) and (c) give concepts of further another embodiment of the representation area having gaps according to the invention.

DETAILED DESCRIPTION OF THE INVENTION

Figure 15:
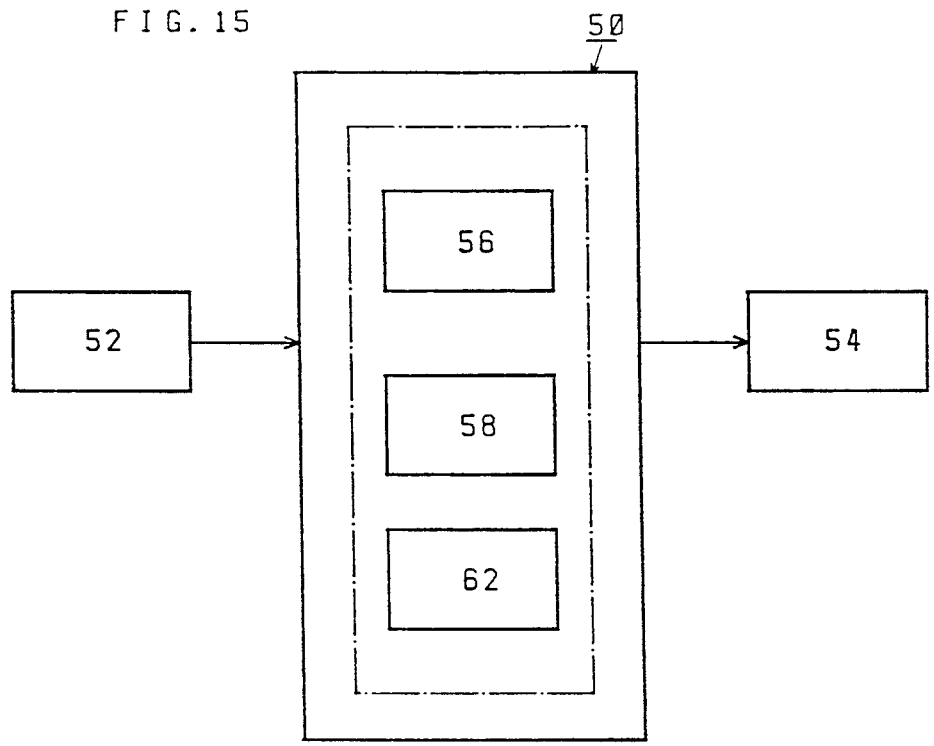
FIG. 15 and FIG. 16 show a block diagram illustrating a method of reading an identification code sheet according to the invention.

The following is a detailed description of the preferred embodiments of the invention relative to the accompanying drawings, wherein the numerals in the different views identify identical parts.

FIG. 1, shows an embodiment of the invention in form of a strip of identification code sheet 10. Said identification code sheet 10 is a strip of code sheet 12 which may be of either paper or plastic film or the like. In the center zone of said strip is printed an representation area 14 on the face of the identification code sheet 12. Said representation area 14 bears the representation area 20 defined by a X-axis 16 and a Y-axis 18 in form orthogonal coordinates, wherein a signal codes 22 is printed to represent identification codes 21 in said representation area 20.

Said representation area 20 is sub-divided into sixteen sub-areas 24, in each of which a signal code 22 in terms of binary signal codes of 0 or 1 is to be printed; said area 20 may be of various shapes as illustrated in FIG. 2. FIG. 2(a) gives an illustration of the embodiment where a series of signal codes 22 is arranged in a straight line, with length ratio of X-axis 16 to Y-axis 18 of 16:1.

FIG. 2 (b) shows another embodiment where a series of signal codes 22 is arranged in double straight lines, with X-Y axis length ratio of 4:1. FIG. 2 (c) represents a similiar embodiment, with X-Y length ratio of 1:1. FIGS. 2 (d) and (e) give further another embodiment, with X-Y length ratio, contrary to the same of FIGS. 2 (a) and (b) of 4:1 and 16:1 respectively, to form a longitudinal elongated shape of sheet. The shape of the identification code sheet may be changed properly to meet a particular need.

The sub-areas 24 in the representation area 20 are designed, as illustrated in FIG. 3, to provide a record of the identification code 21, according to $2^{16}$ binary codes as represented by 0000, 1000, 2000, ... FFFF as illustrated in FIG. 4, by arranging $P_1$, $P_2$, $P_3$ ... $P_{16}$ in a horizontal row and in an appropriate order and addressing them and subsequently making a record, in $P_1$, $P_2$, $P_3$ ... $P_{16}$, of a binary signal of either 0 or 1. Said binary signal 26 used to print in the individual sub-areas 24 may have various shapes as shown in FIG. 5. In FIG. 5 (a) is given an example of mark filling up almost totally a sub-area 24 of a rectangular form, while FIGS. 5 (b), (c), (d) and (e) show other marks of round, star, triangle and four-dot combination form, with a blank left in the periphery of said sub-area 24.

To represent the signal code 22 in the representation area 20 on the identification sheet 10, a suitable printing means of an ordinary type may be applied, and a presently commercially available microcomputor and a computer of 11- or 24-dot type may also be used for the purpose mentioned. For printing, name of merchandize, name of section in charge, office address, name of person, telephon number and any other similar character string, message and statement of advertisement may be converted through the microcomputer, according to JIS rule of coding (or the corresponding similar rule of other countries) and a single representation area 20 of one of $2^{16}$ signal codes 22 for every character. For this, it is preferable to have prior representation of the identification code 21 in terms of a character 28 of Kana-Kanzi, English or some other languages as may be found necessary at a location next to the bottom portion or the like of the representation area 20 for individual signal codes 22, as illustrated in FIG. 6, to facilitate a visual confirmation. This enables one identification code to be expressed as a single character just equivalent to a single identification code thus providing a clean representation in parallel as shown in FIG. 6.

FIG. 7 represents another embodiment of the invention, where a signal code 22 of binary type of the sub-area 24 previously mentioned is sub-divided in such a manner that, as illustrated. $P_1 \sim P_4$, $P_5 \sim P_8$, $P_9 \sim P_{12}$ and $P_{13} \sim P_{16}$ are divided into $Q_1$, $Q_2$, $Q_3$, and $Q_4$ groups respectively, each group having four elements. Said four groups are then recorded in terms of four assemblies 30, according to this embodiment. The method of sub-division of said sixteen sub-areas 24 into total four groups and sequence of arrangement of the signal codes 22 represented in the assemblies 30 may be selected as may be found necessary: for example, they may be ($P_1$, $P_6$, $P_{11}$, $P_{16}$ / $P_5$, $P_{10}$, $P_{15}$, $P_4$ / $P_9$, $P_{14}$, $P_3$, $P_8$ / $P_2$, $P_7$, $P_{12}$, $P_{13}$), ($P_1$, $P_5$, $P_9$, $P_{13}$, / $P_{14}$, $P_{15}$, $P_{16}$, $P_{12}$ / $P_8$, $P_4$, $P_3$, $P_2$ / $P_6$, $P_{10}$, $P_{11}$, $P_7$), ($P_1$, $P_2$, $P_6$, $P_5$ / $P_3$, $P_4$, $P_8$, $P_7$ / $P_{11}$, $P_{12}$, $P_{16}$, $P_{15}$ / $P_9$, $P_{10}$, $P_{14}$, $P_{13}$) etc. or some other types of combination as may be found appropriately.

The selection of individual addresses of sixteen sub-areas 24 or $P_1$, $P_2$, . . . , $P_{16}$ and the same of another sub-areas 24 to be chosen for individual groups $Q_1$, $Q_2$, $Q_3$, and $Q_4$ of the assemblies 30 permits easier addition of cost information to the code of merchandise and ciphered expression of various cards and passwords etc., by changing them via a microcomputer.

It is also to be noted that, in a representation area 20, there an auxiliary representation area 36 defined by the extensions 32 and 34 of the X-axis and the Y-axis, as shown is in FIG. 8 (a) and (b), representenuting an extension of the X-axis 16 and the Y-axis 18, and in a proper location in the said auxiliary area 36, for example the periphery of representation area 20, such as an area diagonal to point of intersection between the X-axis 16 and the Y-axis 18 as illustrated in FIG. 8 (a), in order to facilitate the recording an auxiliary mark 38 of a binary signal, as illustrated in FIG. 8 (b), in the periphery of the representation area 20. Said mark 38 needs not be limited to the rectangular shape as illustrated in FIG. 8 and may have some other shapes, such as round, star, plus, and minus symbols etc., as may be found necessary.

According to the embodiment stated above, identification of the reading direction by a senser is made much easier and interpretation thereby more accurate. Conventional inventions are said to involve, in the case of bar code, a failure of reading where reading angle deviates 45° or more away from the standard. Unlike these, the embodiment according to the invention ensures stabilized interpretation at a high level of the accuracy, regardless of a directional deviation of pasting of the identification code sheet on the merchandise or the directional deviation of reading.

FIG. 9 represents another embodiment of the invention, wherein the representation area 20 is sub-divided by horizontal sub-area separation lines 40 and vertical sub-area separation lines 42, with their separation marks 44 prited at regular intervals.

According to the embodiment mentioned above, sub-areas in representation area may be readily filled up, using a suitable pencil or the like, to make solid or round marks, and entry of the identification code at the site of operation etc., where the pasting of the identification code sheet and correction of entry having been made can be done with extreme ease, and legibility may be improved.

FIG. 10 is another embodiment of the invention, according to which the portions of intersection of horizontal sub-area separation lines 40 with vertical sub-area separation lines 42 in the representation area 20 shown in FIG. 9 are identified with separation marks 44 as illustrated.

According to the embodiment represented by FIG. 10, the scope of the sub-area can be obtained by reading said separation marks put at every intersection, which, in turn, ensures simplification and speeds up of the separation.

FIG. 11 and FIG. 12 are practical examples of the embodiment, respectively. In FIG. 11 are printed, on the identification code sheet 10, representation areas 20 in form of crossed bars, and signal codes 22 and separation marks 44 in rectangular solid blocks, and in FIG. 12 are printed out the dots according to the allotment as illustrated, by means of the microcomputer's printer. Any representation most suitable for a printing means may be made according to the embodiments represented by FIG. 11 and FIG. 12.

For the foregoing embodiments, the description has been regarding sixteen sub-areas 24 of the representation area 20. None the less, they are applicable, as may be found necessary, for twenty or thirty-two etc. which are multiples of four as represented in FIGS. 13 (a) and (b), or said sub-areas 24 of five, six, seven . . . etc. for every assembly 30 as illustrated in FIGS. 13 (c) and (d).

It is also achievable, with embodiments stated above, to provide the numbers of the sub-areas as integer multiples of sixteen and the number of the assemblies as integer multiples of four (or sames of groups as integer multiples of four). Assuming that the number of the sub-areas is $2^n$ and n is equal to five, or the number of the sub-areas is $2^5=32$, the characters can then be expressed, for a single identification code, in terms of combinations of OOOO, . . . VVVV, or $2^{32}=4.292968 \times 10^9$ which means a substantial rise in the number of different characters which can be represented. Furthermore, with $n=6, 7, \ldots$, the coverage of the applicable numbers of characters different by a single identification code then becomes $2^{2n}$ which means a drastic expansion of the coverage mentioned in the exponential function.

It is also achievable, with the said embodiment applied and the number of the assemblies expressed by $2^{n-m}$, to expand exponentially, the number of the assemblies by raising m, according to an increase in n. For the embodiments described, sub-areas are divided into four groups, with $n=4$ and $m=2$. With $n=5$, for $m=2$ ($2^2=4$), $m=3$ ($2^3=8$), division into eight groups, besides four groups, may also be achieved. Where the number of sub-areas is sixty four, with $n=6$, division into sixteen groups may also be achieved, with $m=4$ ($2^4=16$), besides the eight and/or sixteen groups previously mentioned, according to the embodiment represented by FIG. 14.

According to the identification code which the invention concerns, encoding may be achieved to cover as many as $2^{16}=65536$ characters, even with n equal to four, but presently JIS rule Kana-I'anzi codes cover only a small amount of the 7,700 characters, so that it may be reasonably claimed that the embodiments mentioned have a sufficient capacity of encoding the speech symbols of Thai, Arabic, Chinese characters etc. and even the symbols of speech synthesis which have not yet been encoded, for the purpose of register and representation.

For the embodiments described, the identification code sheet has only to be able to be checked to see the presence of a binary signal code for individual sub-areas of representation areas. This means an applicability of paper of ordinary quality to the make of the said sheet and no need for use of a special paper of unusual cost designed for special application, unlike the case with conventional type bar codes. According to the embodiment of the invention, no problem will be encountered in using the identification code sheet, because of reading a binary signal code in the representation area, defined by both the X-axis, and the Y-axis, although the size of code may vary.

The identification code sheet mentioned above may be applied also to papers for name cards, cards, plastic film and the carton's sheet etc. besides ordinary paper.

The embodiment stated previously involves the representation area and/or signal codes to be printed visibly on a paper, a film and a carton's sheet etc., sometimes using transparent magnetic ink. Printing made over a previous printing of ordinary type enables the identification code to be read as if reading were made for a plain print.

As noted, the representation area and the identification code should preferably be represented by printing or with magnetic ink, but conventional technics of conventional punch-type signals are not excluded from an application.

Figure 16:
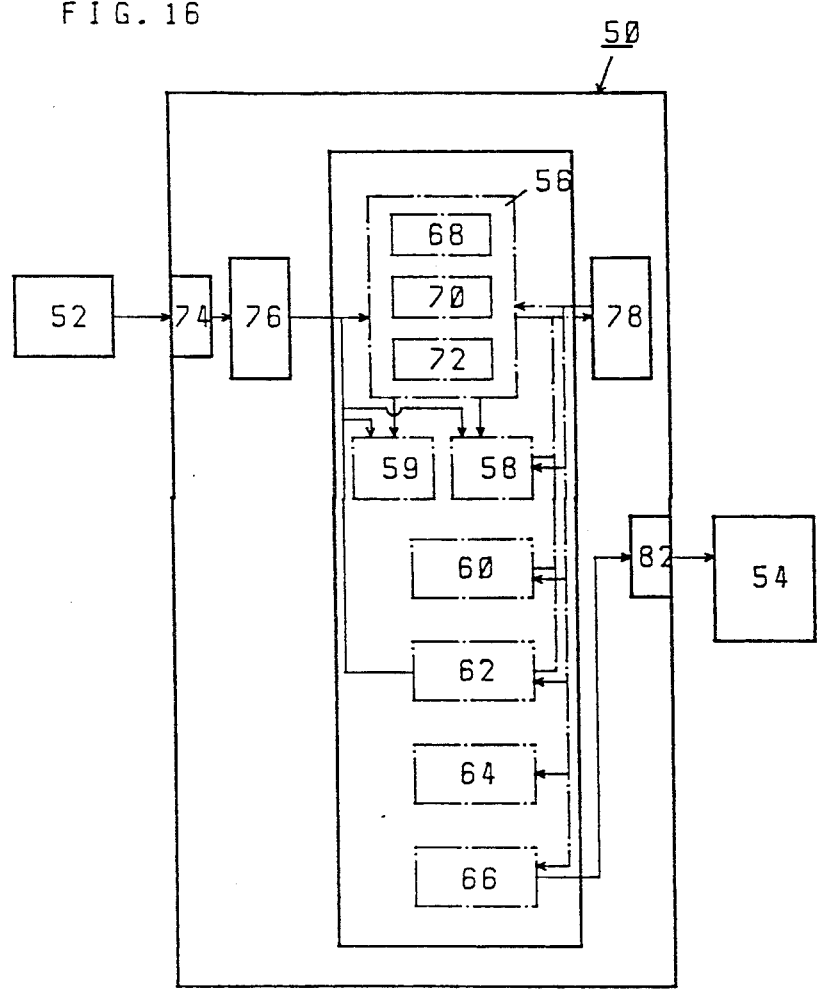
Figure 17:
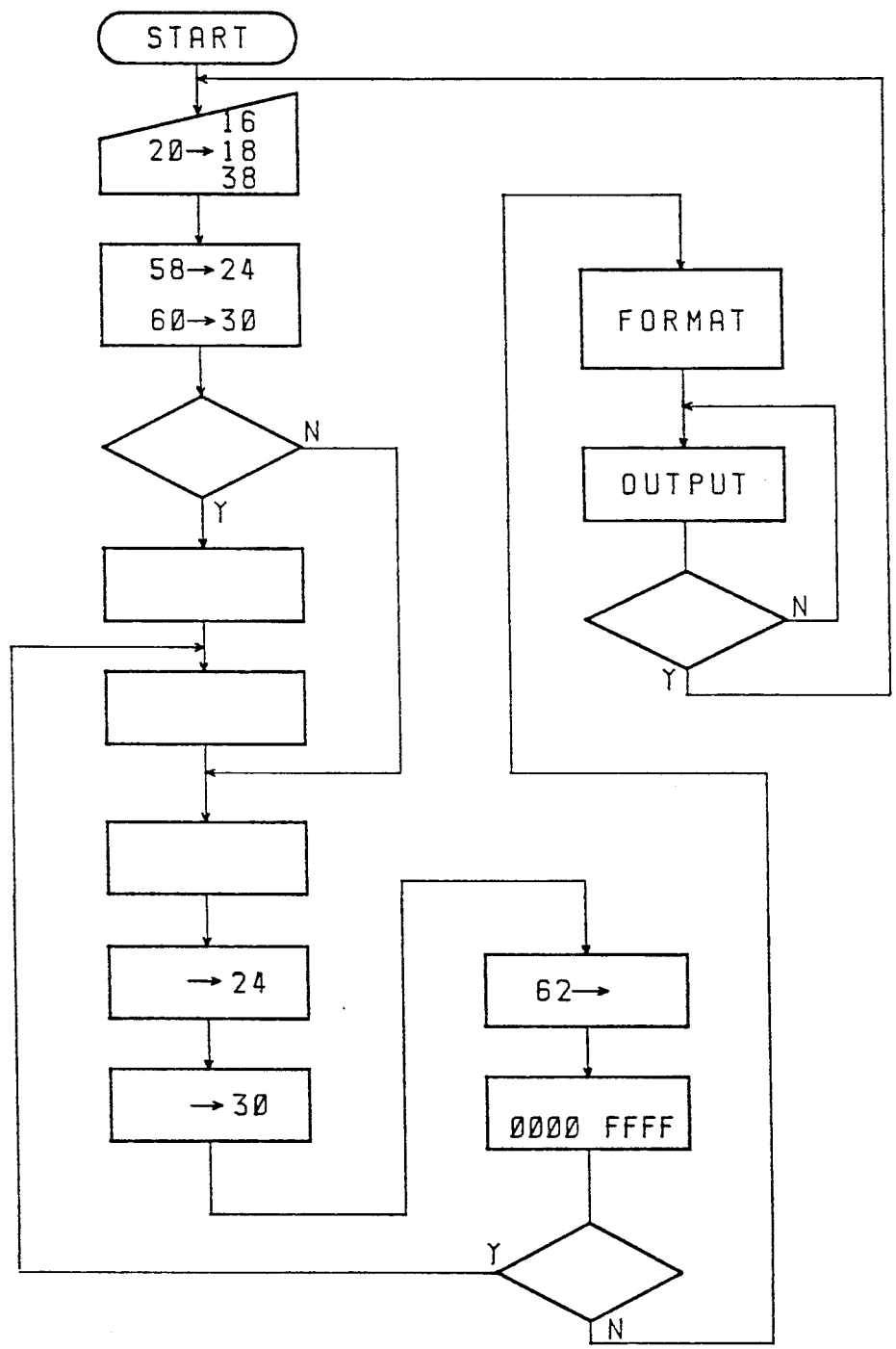
FIG. 17 is a flow chart showing a method of reading the identification code sheet according to the invention.
Figure 20A:
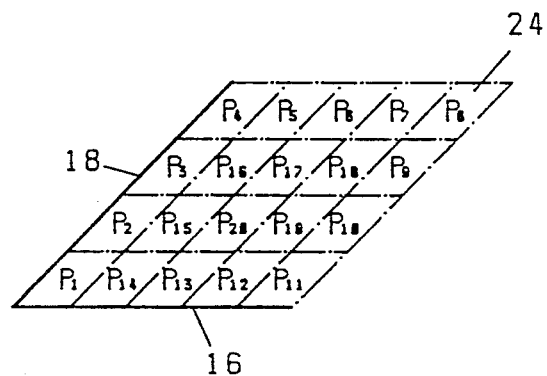
FIGS. 20 (a), (b), (c), (d) and (e) show various embodiments where the X-axis and the Y-axis are arranged skew relative to each other, representing still further another embodiment of the invention.
Figure 20B:
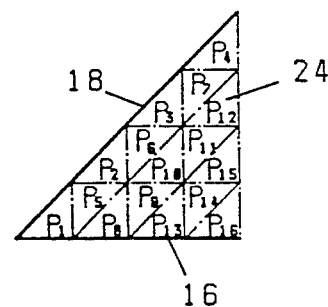
Figure 20C:
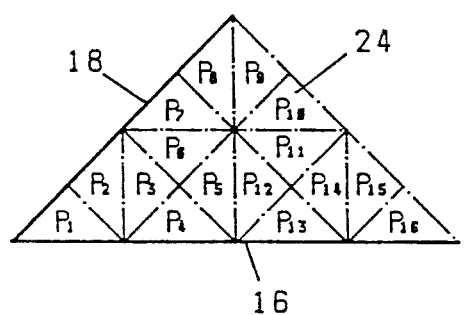
Figure 20D:
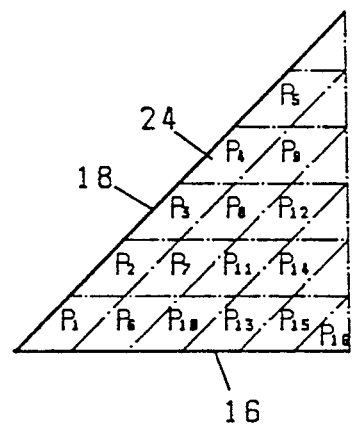
Figure 20E:
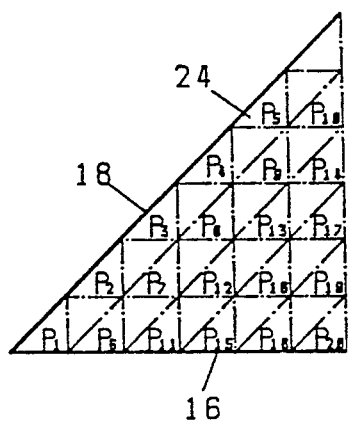

FIG. 15, FIG. 16 and FIG. 17 concern an example of the method of reading the identification code sheet 10 according to the invention.

To a microcomputer 50, as shown in FIG. 15 and FIG. 16, is connected a reading senser 52 such as a bar code reader to read the representation area 20 and signal codes 24 for signal input, followed by subsequent internal processing, the result thereof being displayed on an output means 54 (CRT or a printer having been connected as described later). As illustrated, said computer 50 comprises a means 56 of determining representation areas, a means 58 of determining sub-areas, a means 60 of determining assemblies, a means 62 of detecting presence of binary signals, a means 64 of converting binary codes and a means 66 of converting codes for output means, the circuit thereof being set up by IC, LSI and like, respectively.

Said means 56 of determining representation areas is set up, as illustrated in FIG. 16, by a means 68 of determining the X-axis, a means 70 of determining the Y-axis and a means 72 of correcting a direction of X-axis in order to enable the detection of the representation area 20 of the identification code sheet 10 affected by input from the senser 52 to read the identification code, through an interface 74 for reading the data and a means 76 of setting memories.

Said means 58 of determining sub-areas serves to divide the data having been input according to setting by a means 78 of setting memories or the means 56 of determining representation areas, at a required interval and into a required number of sections in the direction of both the X-axis and the Y-axis, and where separation marks 44 are present, to detect the marks 44 being followed by calculation for gaps between the marks and the X-Y axis to enable the division of the representation area 20 into the sub-areas 24 of a number as may be required.

Said means 60 of determining the assemblies serves to group said sub-areas 24 into the assemblies 30 as required through a means 59 of detecting separation marks and determining sub-areas or the likes, according to setting by the means 78 of setting the memories and combining with address having been stored in a predetermined number of groups of sub-area 24.

Said means 62 of detecting presence of binary signals is useful to find binary signal marks 26 when the input is proportional to a predetermined area of said marks 26 having been input by graphic processing of sub-areas 24 as required (for example, in case of an embodiment represented by FIG. 12, a total sum corresponding to four to nine dots) and absence of the same when not.

Said means 64 of converting binary codes serves to determine an identification signal code through interpretation of presence of binary signal marks 26 of individual sub-areas 24, in order to transmit the same to the means 66 of converting code for the output unit. 82 stands for an interface for the output to the printer and CRT.

According to a manner described above, said interpretation is made, pursuant to a flow chart shown in FIG. 17, one by one, to sense the X-axis 16, the Y-axis 18 and the auxiliary mark or the marks 38 etc. of the identification code sheet 10 read by said senser 52 through the means 56 of determining the representation areas, thus providing values in suitable memory areas, in terms of bit image for a transmission of data of one or more as may be found necessary. Data having been so transmitted is then graphically processed for a rotation and a movement, depending on a means 72 of correcting a direction of the X-axis, and then allocation of both the sub-areas 24 and the assemblies 30 precedingly mentioned is made by said means 58 of determining sub-areas said means 60 of determining the assemblies respectively, in order to convert binary codes for preparation of a determined format to provide successive transmission to the output unit 54 of CRT or a printer. Calculation of extensions of both the X-axis and the Y-axis and auxiliary marks, made availing a graphic analysis, offers a fast determination of a direction of both the X-axis and the Y-axis, enabling graphic reversal or the like as may be required.

The embodiment mentioned involves a reading of an identification codes of the identification code sheet by properly moving a reading senser such as a bar senser: equivalent reading may be had by use of a surface to find a two dimensional size of A4, B5 and B6 etc., for which individual representation areas may be determined according a direction of both said X-axis and said Y-axis and location of said auxiliary mark or marks as previously mentioned, and a direction of character strings may also be determined, depending on the location and the number of said auxiliary marks. For example, in case where, in the pheriphery of the Y-axis 18 of the representation area 20, is provided a single auxiliary mark 38, reading may proceed rightwards according to an arrow, and in another case where two auxiliary marks 38 are printed, reading may proceed leftwards according to another arrow, as shown in FIGS. 18 (a), and (b). And in still another case where, depending on the X-axis 16 of representation area 20, is printed the single auxiliary mark 38, reading may proceed downwards according to an arrow, and in further still another case where double auxiliary marks 38 are printed, reading then proceeds upwards according to an arrow, as shown in FIGS. 18 (c) and (d).

The location and the numbers of the auxiliary marks may also be used as a signal for determining a combination of the sub-areas composing an assembly.

Furthermore, as illustrated in FIGS. 19 (a) and (b), a disposition of gaps 86, both vertical and horizontal, between said sub-areas 24 in the representation area 20 enables a clear distinction of said sub-areas 24 from both the X-axis 16 and the Y-axis 18 and operation of said representation area 20 at an improved level of accuracy, even if binary signal marks 26 of black solid dot have been put both horizontally and vertically, in all the sub-areas 24 arranged, the marks 44 and said binary signal marks 26 then being discontinuous, thus demonstrating a substantial preferability for accurate operation.

It should, however, be noted that it is possible to cause discrimination of a straight line of a series of said binary signal marks 26 from both axes X and Y, by interposing gaps 86 of blank area between the X-axis 16 and the sub-area 24 next thereto and between the Y-axis 18 and said sub-areas 24 next thereto, and that an intermitent disposition of said gaps 86 of blank area as illustrated in FIG. 19 ensures both good result of finding, at an increased accuracy and simplicity in interpretation of the representation area at an improved ease.

FIG. 19 (a) represents an embodiment of the invention where gaps 86 are located next to both the X-axis 16 and Y-axis 18 mentioned as illustrated in FIG. 19 (b), and said gaps 86 may be located in between the sub-areas 24 and further be used for instruction of direction of reading a character string or for the same of combination of the sub-areas setting up an assembly, by use of gaps as a signal in place of an auxiliary mark or marks, through a proper change of the location and numbers of said gaps 86. Further, binary codes may be printed, in a single representation area, for a plurality of Kana-Kanzi letters, by interposing a split for every $2^n$ sub-areas as shown in FIG. 19 (c).

In the embodiments described, the X-axis and the Y-axis are arranged in mutual orthgonality, but they may be disposed intersected at a suitable angle as exampled in FIGS. 20 (a), (b), (c) and (d), and moreover they may have any shapes other than a rectangle.

All the embodiments described previously concern processing in the form of a single task to perform a computer processing, but may also ensure a higher speed of input of a senser output to memory areas, the operation and the output in a multitask system.

Various embodiments have been described previously merely to aid the understanding of the invention, and variations may be made by one skilled in the art without departing from the spirit and the essential features of the invention, being not limited to the specific embodiments mentioned.

What is claimed is:

1. In combination an identification code and reading system therefore, comprising:
    the identification code including,
        a representation area including,
            a computer readable orientation border, positioned adjacent to said representation area on at least two sides,
            a plurality of sub-areas in which encoded indicia are located,
            orthogonal rows and columns of separation marks, separating the plurality of sub-areas, and
            a nonsymmetric auxiliary representation mark, provided adjacent to said representation area such that said representation area is defined by an area enclosed by said computer readable orientation border and said nonsymmetric auxiliary representation mark; and
    the identification code reading system including,
        reading means including,
            data reading means for reading the plurality of sub-areas in which encoded indicia are located and the orthogonal rows and columns of separation marks and for generating data signals representative of the encoded indicia,
            area detecting means for detecting said computer readable orientation border and said nonsymmetric auxiliary representation mark in order to determine a scanning direction and an angle of orientation of said identification code with respect to said reading means and for generating a scanning direction signal and an angle of orientation signal,
            correcting means for correcting the data signals generated by said reading means depending on the scanning direction signal and the angle of orientation signal generated by said area detecting means in order to produce corrected data signals, and
            translating means for translating the corrected data signals into character information, represented by the encoded indicia.

2. The combination of claim 1, wherein a number of said plurality of sub-areas is sixteen.

3. The combination of claim 2, wherein the sixteen sub-areas are divided into four or more assemblies.

* * * * *